Figure 1:
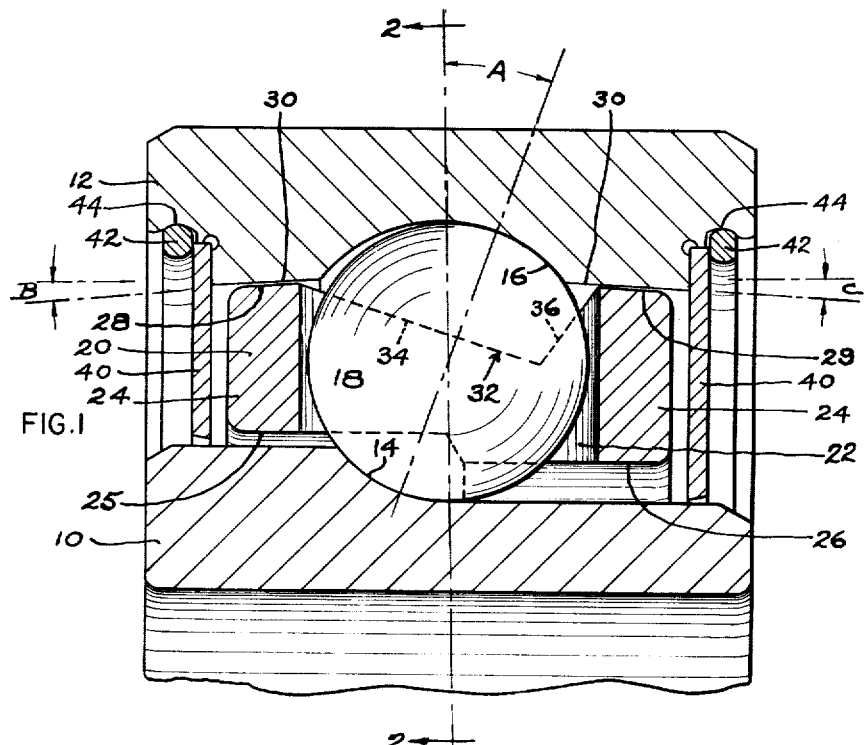

July 2, 1963   C. N. HAY   3,096,129
ANTIFRICTION BEARING AND LUBRICATION THEREFOR
Filed Sept. 11, 1961

INVENTOR
CHARLES N. HAY
BY Edward H. Goodrich
HIS ATTORNEY

United States Patent Office 3,096,129
Patented July 2, 1963

3,096,129
ANTIFRICTION BEARING AND LUBRICATION THEREFOR
Charles N. Hay, Sandusky, Ohio, assignor to General Motors Corporation, Detroit, Mich., a corporation of Delaware
Filed Sept. 11, 1961, Ser. No. 137,234
7 Claims. (Cl. 308—187)

This invention relates to antifriction bearings and more particularly to an improved lubricating arrangement for precision ball bearings.

The development of guidance systems for aircraft and particularly for long range missiles has resulted in improved manufacturing methods and techniques for precision ball bearings wherein such bearings and particularly those bearings used in gyroscopes are now being manufactured to unprecedented accuracies. The accuracies in these bearings are frequently such that their radial tolerance lies within a few millionths of an inch. Even when these extreme accuracies are built into a ball bearing, the lubrication of the bearing may introduce an inaccuracy during bearing operation. In gyroscope bearings which must operate without attention at very high speeds for long periods of time, it has been the practice to employ a bearing supplied wtih the minimum required amount of lubricant such as a very light bodied oil. In accordance with usual practice, the balls of such a bearing are guided by an annular separator wherein each ball is loosely received in a pocket of the separator. During high speed operation of the bearing, the light wiping action of each ball against a side wall of the separator pocket, deposits much of this lubricant on the separator pocket wall. Centrifugal force resulting from high speed separator rotation causes this lubricant to flow radially outwardly on the walls of these separator pockets. This lubricant, upon reaching the separator periphery, is then thrown off onto a raceway of the bearing in the form of successive small drops that are deposited directly in the path of a ball rolling under load against the raceway. Due to the high speed operation of the bearing, these drops of lubricant do not have time to dissipate before being engaged by the oncoming balls. Hence, these drops even when very small, impede rolling action of the balls causing a momentary bump when each ball encounters such a drop. This lubricant impediment to these otherwise smoothly rolling balls is commonly referred to as jogs. Prior to my invention, these jogs prevented the precise performance of such bearings within the capabilities to be expected from their accurate construction.

It is, therefore, an object of my invention to provide an improved construction for antifriction bearings which provides even distribution of lubricant within the bearing.

A further object is to provide an improved antifriction bearing of the rolling-element type wherein a minimum amount of lubricant is uniformly recirculated throughout the bearing without unevenly depositing lubricant in the path of the rolling elements.

A still further object of my invention is to provide an improved lubricating arrangement for a ball bearing wherein a small amount of lubricant is circulated through the bearing and is prevented from being thrown off of the moving parts of the bearing in the form of drops deposited in the path of the balls.

Figures 2, 3:
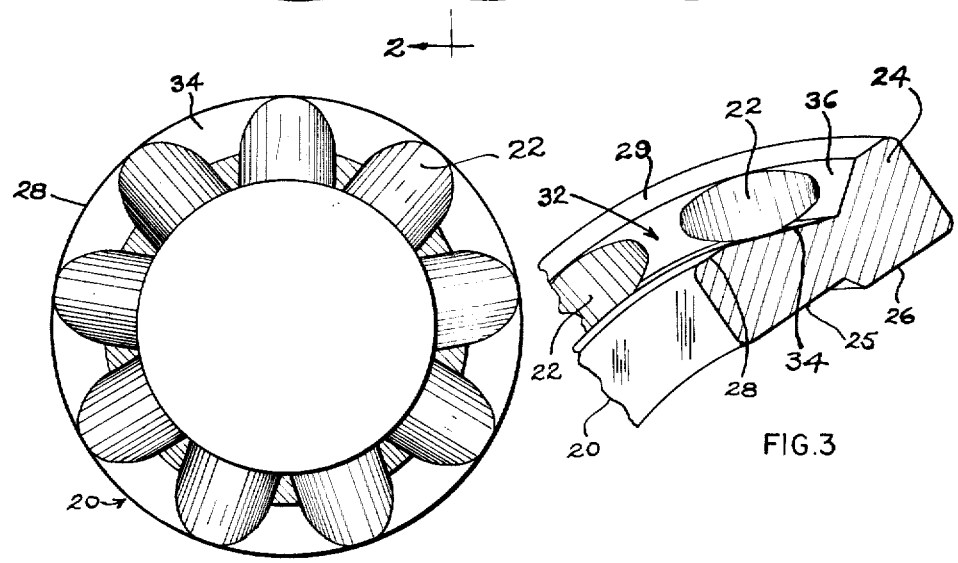

To these ends and to improve generally upon devices of this character, this invention consists in the various matters hereinafter described and claimed. In its broader aspects, the invention is not necessarily limited to the specific arrangements selected for illustrative purposes in the accompanying drawings wherein FIGURE 1 is a fragmentary view of a radial section through my bearing;

FIGURE 2 is a diametrical section through the ball separator and taken along the line 2—2 of FIGURE 1; and FIGURE 3 is a fragmentary perspective view of the separator.

My improved bearing is particularly adapted for both high speed precision operation for long periods as required in gyroscopes. This bearing has a pair of inner and outer race rings 10 and 12 respectively provided with accurately ground inner and outer raceways 14 and 16 in which roll a complement of precisely ground balls 18 circumferentially spaced by an annular separator 20. To assure accurate running fit of the balls against both raceways and to maintain the race rings coaxial, this bearing may be of the angular contact type having a suitable contact angle as indicated at A. One of these race rings is axially positioned under load with respect to the other ring to maintain this contact angle, thus axially as well as radially positioning a shaft supported by this bearing.

The separator 20 comprises a ring-shaped member provided with a series of circumferentially spaced pockets 22 each of which loosely receives a ball 18 and from which the ball projects into engagement with the inner and outer raceways. As illustrated, these pockets may be cylindrical and radially extend through the separator. The separator ends comprise ring portions 24 which terminate in inner annular lands 25 and 26 and in outer similar annular lands 28 and 29—these outer lands being in free-running rotatable bearing engagement with similar annular lands 30 at each side of the outer raceway 16. The separator may be composed of a suitable material which has a low coefficient of friction with the balls and with the outer race ring in the presence of lubricant. This separator may be of a lubricant-absorbent material as a sintered bronze or of a suitable molded material. Such a molded material may include various plastics which have a low coefficient of friction when in contact with a rotated metal surface in the presence of lubricant and which will not detrimentally be affected by light, heat or bearing lubricants. A synthetic polymeric amide, commonly referred to as "Nylon," and a polymeric tetrafluoroethylene, commonly known as "Teflon," are examples of various molded materials which I have found satisfactory for my improved separator. Also, if desired, these molded materials may be reinforced with cotton fibers or other lubricant-absorbent materials.

In precision ball bearings operated at very high speeds under an extremely low torque and wherein such bearings rotatably support and precisely locate a rotor as in the case of a gyroscope, these bearings usually operate under a minimum lubrication provided by a marginal amount of a very light oil which may even be in the form of a mist. The coating of lubricant which normally separates the moving parts in the usual ball bearing is of appreciable thickness. In a high speed precision gyro bearing, this thickness of lubricant may be sufficient to impede the rolling action of the balls causing heating of the bearing and materially affecting the accuracy of the bearing particularly when such coating of lubricant even minutely varies in thickness. Also, one inherent difficulty common to precision ball bearings of this type lies in the fact that lubricant collected on each of the balls is wiped off by the balls onto a ball pocket wall and is thereafter thrown in the form of droplets from the upper edge of the ball pocket at the cylindrical separator periphery onto the raceway in the path of the next ball in the bearing. Due to the high speed operation of such a bearing, these drops do not have opportunity to spread out into a film before they are engaged by the next oncoming ball. Hence, these drops form small abrupt obstructions which impede the smooth rolling action of the balls causing the balls to vibrate and bump against the raceways thus materially affecting the accuracy and life of the precisely manufactured bearing.

The present invention eliminates the deposit of these impeding drops of lubricant on the raceway and therefore greatly improves the accuracy and life of a bearing. To overcome this difficulty which has been inherent in prior precision bearings and particularly in high speed gyro bearings, my annular separator 20 is provided with an external annular groove 32 that is generally V-shape in cross section and formed by a pair of frusto-conical walls 34 and 36 laterally extending from a vertex preferably located at one side of the plane of ball centers. The annular lands 28 and 29 at the sides of the ball pockets 22 are preferably slightly frusto-conical and slope radially outwardly towards the diametrical plane of the ball centers. This slope illustrated at B is in the general range of two to five degrees and the annular lands 30 of the outer raceway correspondingly slope as indicated at C for loose interfitting lubricated plain bearing relation of the separator with the outer race ring. This slope which is preferably small is dependent upon the bearing lubricant used and the speed of bearing operation.

With this construction, the lubricant collected on the wall of each ball pocket due to wiping engagement of the ball thereagainst, is centrifugally fed radially outwardly of the ball pocket until it encounters the edge of the laterally sloping surface 34 or 36. This lubricant instead of being radially thrown outwardly from a cylindrical external portion of the separator onto the outer raceway as formerly, now flows laterally outwardly up the sloping surfaces 34 and 36 to the sides of the bearing where it engages and spreads over the adjacent frusto-conical annular surfaces 28, 29 and 30. The radially outward slope of these frusto-conical surfaces thereafter feeds the lubricant as a smooth film laterally back into the outer raceway where it uniformly flows between the balls and raceway thus eliminating the detrimental droplets which previously impeded accurate bearing operation. This light film of lubricant fed into the outer raceway is again picked up by the balls and recirculated through the bearing. With this arrangement, a very small amount of lubricant is uniformly fed and recirculated through the bearing as a thin but protective film within the bearing thus greatly increasing the accurate operation of the bearing. The longer sloping annular surface 34 is perferably directed towards the non-loaded side of the bearing as shown so that this surface will collect the major portion of lubricant from the ball pockets and feed this lubricant as a thin uniform film to the engaging annular lands 28 and 30 from whence it evenly distributes into the capillary angle between the balls and the raceway 18 as shown. The bearing balls 18 are coated with a film of lubricant which is distributed onto the inner raceway by these balls. Due to centrifugal forces and the rolling movements of the balls, droplets of lubricant do not tend to be deposited upon this inner raceway 14.

Although the present invention is illustrated in connection with an annular contact bearing, it will be appreciated that this invention also applies to a radial type ball bearing wherein the balls do not contact at the opposing inner and outer raceways in angular relation. Also, it will be appreciated that, if desired, the separator could be in land riding relation upon the inner race ring since the frusto-conical outer end separator faces 28 and 29 would still feed the lubricant as a film back into the outer raceway 16. I preferably close the ends of the bearing by a suitable seal or shield arrangement. This is herein illustrated as a stamped-out annular shield 40 of suitable material demountably seated in a counterbore in the end of the bearing and demountably held in position as by a snap ring 42 received in a mounting groove 44. The peripheral fit of the shield 40 against the outer race ring 12 is sufficiently tight to prevent lubricant leakage therebetween.

I claim:

1. In a lubricated antifriction bearing having a series of rolling elements between a pair of relatively rotatable race rings, an annular rotatable separator between the race rings and journalled on one of said rings, said separator having spaced rolling element-receiving pockets, the separator being provided at its periphery with pocket edges which slope laterally and radially outwardly to divert lubricant from the outer pocket ends to a side of the bearing during separator rotation, and one side of the separator having a frusto-conical surface surface which receives the diverted lubricant and laterally feeds it back into the bearing between the rolling elements during bearing operation.

2. In a lubricated ball bearing having a series of balls engaging raceways on a pair of relatively rotatable inner and outer race rings, an annular separator provided with circumferentially spaced ball-receiving pockets, and said separator being provided with a peripherally extending V-shaped groove having frusto-conical walls extending to the outer ends of said pockets and extending to the sides of the separator from a circumferentially extending intersection which lies offset from the plane of ball centers, said frusto-conical walls spreading the lubricant fed out of the ball pockets in the rotating separator to the sides of the bearing.

3. In a lubricated ball bearing having a series of balls engaging raceways on a pair of relatively rotatable inner and outer race rings, an annular separator provided with ball-receiving pockets radially extending therethrough, end rings on the separator, one of said end rings having a frusto-conical surface sloping radially outwardly towards the raceway in said outer ring, the separator having spaced ball-receiving pockets radially extending therethrough, and the periphery of said separator being provided with a frusto-conical surface interrupted by the outer ends of the ball pockets and extending laterally and radially outwardly into angular engagement with said first-mentioned frusto-conical surface, whereby lubricant emerging from the revolving separator pockets will be fed laterally on the second mentioned frusto-conical surface and then onto the first mentioned frusto-conical surface and therefrom into the outer raceway.

4. In a lubricated ball bearing having a series of balls rotatably engageable with inner and outer raceways in inner and outer race rings, an annular separator having spaced ball-receiving pockets, end rings on the separator in slidable bearing engagement with the outer race ring at each side of its raceway, one of said end rings matingly and frusto-conically engaging the outer race ring, said frusto-conical surface increasing in diameter towards the outer raceway, and the periphery of the separator being provided with a sloping surface of revolution which intersects the outer ends of the ball pockets and which extends laterally and radially outwardly into angular engagement with said frusto-conical end ring portion whereby lubricant fed out of the pockets under centrifugal force of separator rotation is diverted from being radially deposited in the path of the rolling balls and is fed to the side of the bearing and laterally into the outer raceway.

5. In a lubricated ball bearing having a series of balls for rolling engagement with inner and outer raceways in inner and outer race rings, an annular separator having spaced ball receiving pockets, end rings on the separator having sloping surfaces of revolution in slidable mating bearing engagement with the outer race ring at the sides of its raceway, said surfaces sloping laterally inwardly and radially outwardly towards the outer raceway, and the periphery of the separator having an annular extending groove opening into the outer ends of said ball pockets, the groove having its root diameter offset from the plane of ball centers and having sloping side walls which respectively extend to the sloping surfaces of revolution on the end rings of the separator.

6. In a lubricated angular contact ball bearing having a series of balls for rolling angular contact loaded engagement against inner and outer raceways in inner and outer race rings, an annular rotatable separator having space ball-receiving pockets, an end ring on the separator, and said separator and said outer ring having cooperating sloping surfaces of revolution which divert the lubricant fed from the ball pockets under the centrifugal force of separator rotation to the unloaded side of the bearing and then laterally into the outer raceway as a lubricating film.

7. In a lubricated ball bearing having a series of balls for rolling engagement with inner and outer raceways in inner and outer race rings, an annular separator having spaced ball-receiving pockets, end rings on the separator having frusto-conical surfaces in plain bearing-mating engagement with the outer race ring at each side of its raceway, the separator periphery having a V-shaped annularly disposed groove extending across the ends of said pockets, the root diameter of the groove lying at one side of the plane of ball centers, the frusto-conical side walls of the groove respectively extending to the frusto-conical end ring surfaces, said frusto-conical surfaces cooperating to divert lubricant from being radially thrown into the ball paths and to recirculate lubricant along said surfaces and laterally into the outer raceway, and closure means at the ends of said bearing.

References Cited in the file of this patent
UNITED STATES PATENTS

| | | |
|---|---|---|
| 2,779,640 | Jones | Jan. 29, 1957 |
| 2,911,267 | Small | Nov. 3, 1959 |
| 2,975,008 | Ruley | Mar. 14, 1961 |
| 3,025,115 | Shevchenko | Mar. 13, 1962 |

FOREIGN PATENTS

| | | |
|---|---|---|
| 873,020 | Germany | Apr. 9, 1953 |
| 719,829 | Great Britain | Dec. 8, 1954 |

UNITED STATES PATENT OFFICE
CERTIFICATE OF CORRECTION

Patent No. 3,096,129                          July 2, 1963

Charles N. Hay

It is hereby certified that error appears in the above numbered patent requiring correction and that the said Letters Patent should read as corrected below.

Column 2, line 8, strike out "both"; column 3, line 60, for "annular" read -- angular --; column 5, line 6, for "space" read -- spaced --.

Signed and sealed this 14th day of January 1964.

(SEAL)
Attest:
ERNEST W. SWIDER                        EDWIN L. REYNOLDS

Attesting Officer                        Acting Commissioner of Patents